Sept. 3, 1935.  G. TAUSCHEK  2,013,012

RECORD FILING AND SELECTING APPARATUS

Filed July 20, 1932  4 Sheets-Sheet 1

INVENTOR
GUSTAV TAUSCHEK
BY Frank W. Lowritzer
ATTORNEY

Sept. 3, 1935.     G. TAUSCHEK     2,013,012
RECORD FILING AND SELECTING APPARATUS
Filed July 20, 1932     4 Sheets-Sheet 2
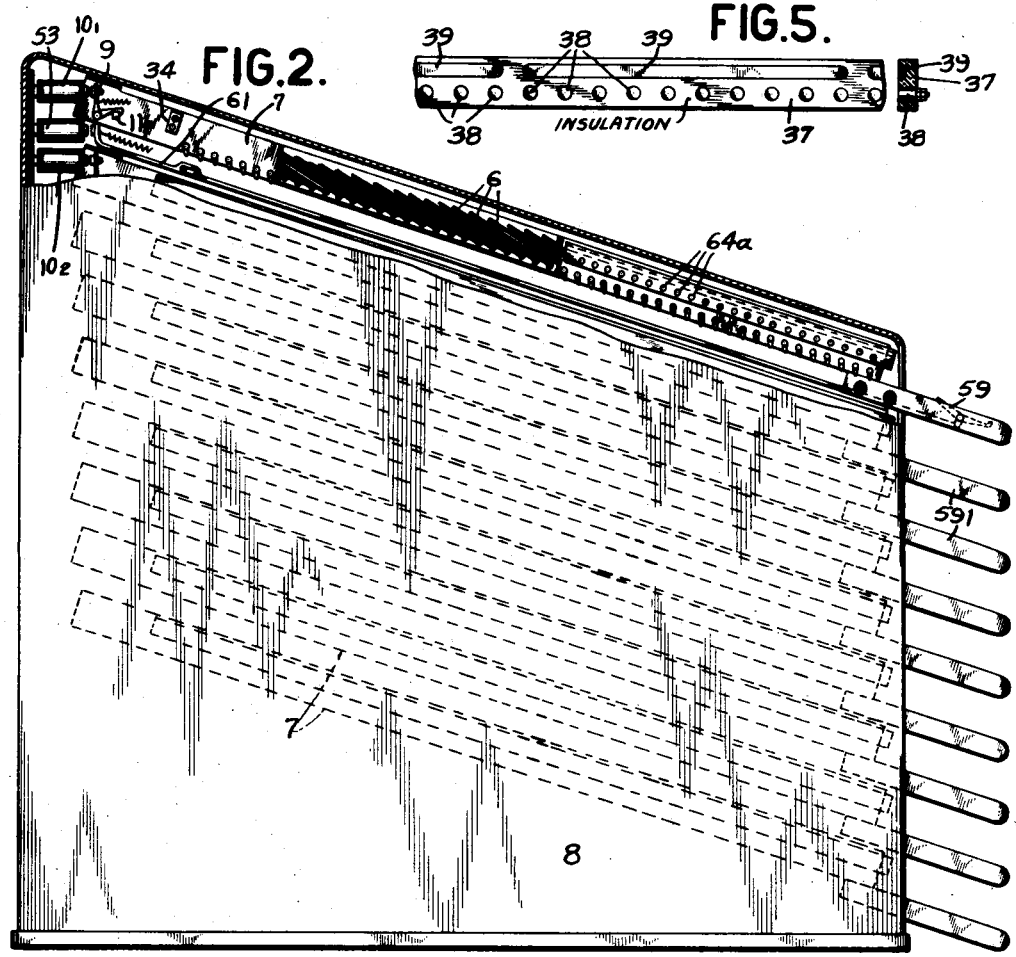
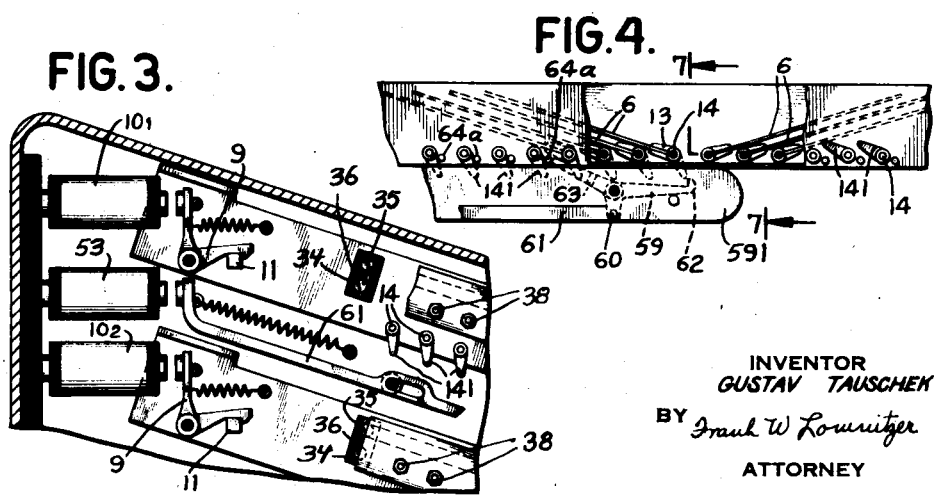
INVENTOR
GUSTAV TAUSCHEK
BY Frank W Lowritzer
ATTORNEY Sept. 3, 1935.  G. TAUSCHEK  2,013,012

RECORD FILING AND SELECTING APPARATUS

Filed July 20, 1932  4 Sheets-Sheet 3

INVENTOR
GUSTAV TAUSCHEK
BY Frank W Lometyer
ATTORNEY

Sept. 3, 1935.  G. TAUSCHEK  2,013,012
RECORD FILING AND SELECTING APPARATUS
Filed July 20, 1932  4 Sheets-Sheet 4

INVENTOR
GUSTAV TAUSCHEK
BY Frank W Lournitzer
ATTORNEY

Patented Sept. 3, 1935

2,013,012

UNITED STATES PATENT OFFICE 2,013,012

RECORD FILING AND SELECTING APPARATUS

Gustav Tauschek, Mountain Lakes, N. J.

Application July 20, 1932, Serial No. 623,573

42 Claims. (Cl. 129—16.1)

This invention relates to improvements in selective controlling means for record systems wherein provisions are made to select, for example, a designated record forming part of a series.

It is the main object to provide an improved arrangement comprising a primary selector, secondary, and tertiary selectors for selecting records individually, preferably under control of suitable controlling devices.

It is, more specifically, an object to arrange such selection under control by electrical instrumentalities to provide for less complicated selecting devices which are adapted for distant control, particularly valuable in credit authorization systems.

It is a further object to cause such selections to be effected by suitable controlling devices of an accounting machine and to simultaneously indicate the amount of entry to be made in the accounting machine in order that a person in the bookkeeping department may authorize credit for the amount indicated. A system of signalling is provided to also inform the operator of the accounting machine whether authorization is given.

In the present arrangement a novel form of indicating apparatus is used employing "glow" tubes which effect an amount of illumination proportional to the amount of entry, such tubes also facilitating distant control by their electrical wiring connections.

As the invention is understood, it will be obvious that parts of the combined apparatus may be used singly, as well as in combination, for the same or other purposes and their combinational showing should not be construed as restrictive but merely illustrative.

With respect to the record-selecting apparatus a plurality of receptacles are employed, each carrying 50 records, such as accounts, checks, paper slips, or other articles capable of individual selection. A bank of keys selects the drawers of the hundreds group, and as the drawers contain fifty records each, a second bank of keys designating groups of ten selects the desired drawer, and a third bank of keys selects the units of the record in the preselected tens group. The final or digit selection occurs during the movement of the selected drawer, although it is obvious that selections may, in other arrangements, be effected independently of the movement of the drawer.

The drawers may, if desired, carry other elements to be selected and the description of records and their use in the system disclosed is not intended to confine the use of the invention to such elements.

In said drawings:—

Fig. 2 is a view in side elevation of the record-holding cabinet and a fragmentary view of a portion of the record-selecting mechanism.

Fig. 3 is a detail view of a part of the electrical controlling devices.

Fig. 4 is a detail view of part of the record-selecting mechanism.

Fig. 5 is a combined view in side elevation and section of another part of the electrical controlling devices.

Account or record selecting devices

Figure 1:
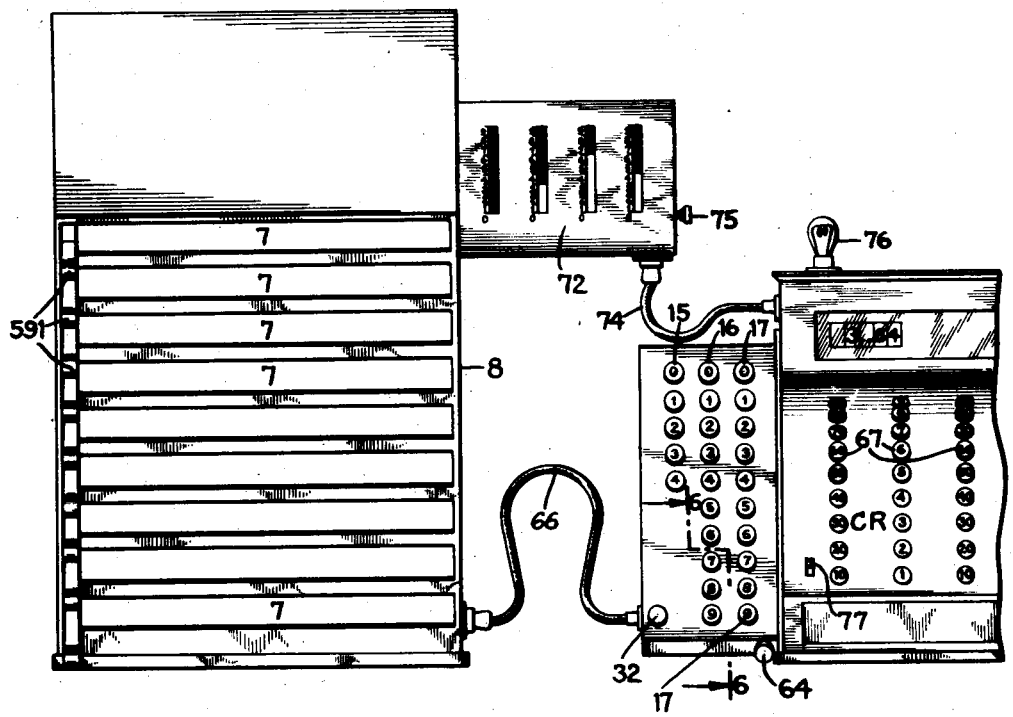
Fig. 1 is a diagrammatic arrangement of the credit authorization apparatus constucted according to the present invention.

The individual records 6 are carried by receptacles such as drawers 7, there being a plurality of such drawers and each mounted in a cabinet 8. By any suitable means each drawer is slidably mounted in the cabinet so that it can be moved by suitable spring means or else by the action of gravity to record inspection position.

As the invention is shown in connection with nine drawers, the selective control for such a number will be explained but it will be obvious there may be provided a greater or lesser number.

Each drawer when in record-concealing position in the cabinet is latched in place by a related latching lever 9 which is of a bell-crank formation, one arm constituting an armature which is attracted by a magnet 10 and the other arm being of a hook formation to engage a stud 11 secured to the associated drawer 7.

In each of the drawers 7 is a series of records 6 arranged in overlapping relationship. Each record 6, as more particularly shown in Fig. 4, is fitted within a slot of a clamp 13 which is pivoted at 14 in the drawer.

Each drawer is arranged to carry fifty of such records 6 so that a predetermined pair of adjacent records may be separated to permit visual inspection of one of the adjacent records.

The selection is preferably under control of three banks of keys 15, 16 and 17. Banks of keys 15 and 16 together determine which drawer is to be selected. Keys of bank 16 select the group of ten records in the preselected drawer and a particular key of the bank 17 selects the particular record of the preselected tens group.

For example, to select record 150, the "1" key in bank 15 is depressed, the "5" key in bank 16, and the "0" key in bank 17.

Figure 6:
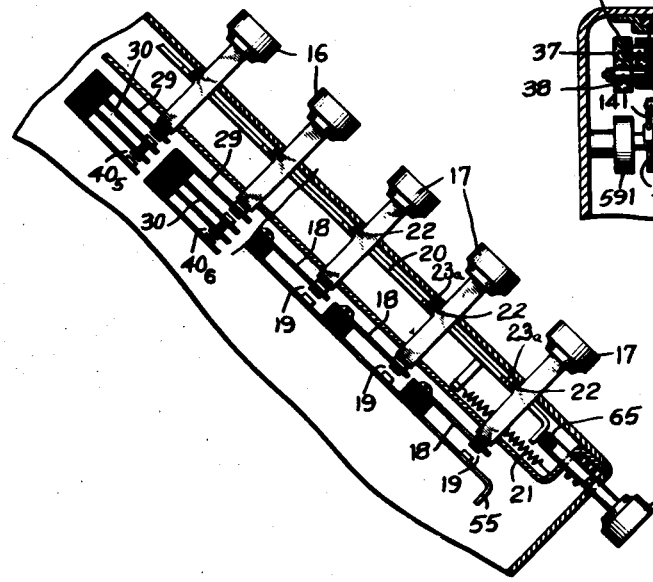
Fig. 6 is a sectional view of a portion of the keyboard taken on the line 6—6 of Fig. 1.

Fig. 6 shows a preferred construction of the key banks illustrated by the arrangement provided for keys 16 and 17. Each key 17, for example, is depressed against the action of resilient contact blades 18 to close contacts 19 and when the key is sufficiently depressed a related slidable detent plate 20 is moved by an inclined lug 22 of the stem of the key acting against a lug 23a of the detent plate so that in a certain position of the key a spring 21 shifts the detent plate to hold the lug 22 below lug 23a to hold the key depressed.

Figure 11:
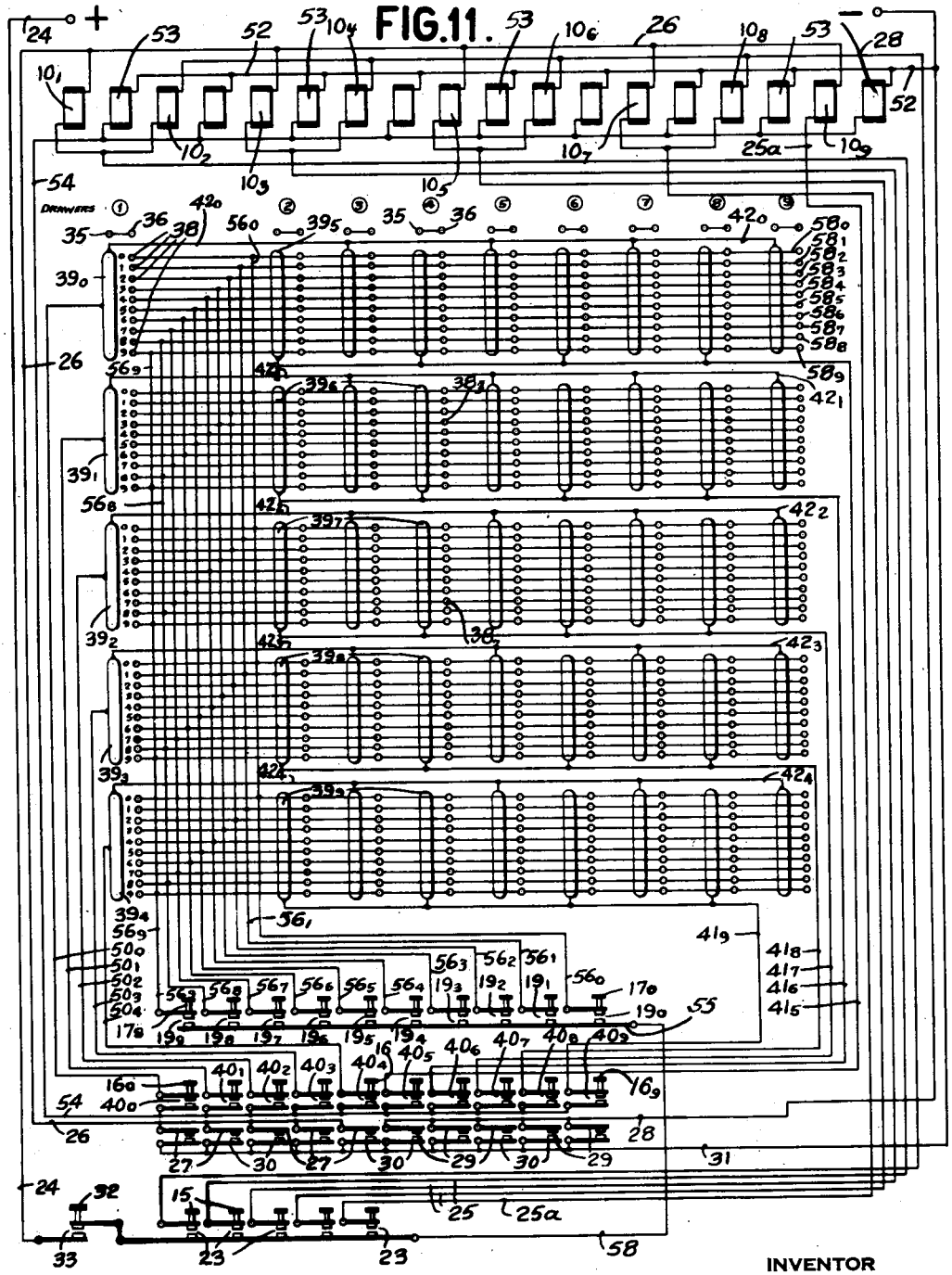
Fig. 11 is a diagram of preferred electrical wiring connections of the record-selecting controlling devices.

Referring to the wiring diagram in Fig. 11 it will be observed that a set of contacts 23 is closed by a related key 15. From the positive terminal of a source of electrical power a wire 24 leads to one point of each of the sets of contacts 23, so by closing one set of said contacts 23 the circuit is extended by a related wire 25 for the left four contacts to the related pair of magnets 10 while the contacts 23 at the extreme right in Fig. 11 close a circuit by a wire 25a to a single magnet $10_9$ at the upper right in Fig. 11.

There are five keys 15 representing the groups of records 0-99, 100-199, 200-299, 300-399, 400-449, nine drawers and a single magnet 10 for each drawer so that the particular magnet 10 of the pair selected will depend upon which tens group is selected by the key 16 depressed. Whenever a pair of magnets 10 is selected, a single magnet by a connection now to be described is connected to the negative line side.

In connection, for example, with the magnets $10_1$, $10_3$, $10_5$, $10_7$ and $10_9$ controlling the selection of the 1st, 3rd, 5th, 7th, and 9th drawers it will be observed that such magnets are electrically connected together by a wire 26 which connects such magnets to the five left sets of contact points 27. Magnets $10_2$, $10_4$, $10_6$, and $10_8$ controlling the selection of the second, fourth, sixth, and eighth drawers are connected by a wire 28 which connects such magnets to the five right contact points 29. There are, of course, a series of ten contact points 30 associated with the two series of contact points 27 and 29 and all the contact points 30 are connected together by a wire 31 which leads to the negative line side. Obviously if any set of the ten sets of contacts 29—30 or 27—30 is closed a particular magnet 10 will be energized although two may have been selected by closure of a set of contacts 23. For example, the key 15 at the extreme left is depressed to select a record under a hundred. If a record below fifty is desired any of the contacts 27—30 will select magnet $10_1$ of the first drawer. If a record above fifty is desired one of the pairs of contacts 29—30 will select magnet $10_2$ of the second drawer.

While a particular magnet 10 is selected for energization, the actual energization occurs only when a special key 32 is depressed which is done after all of the selecting keys of the banks 15, 16, and 17 have been depressed. This key is arranged to close contacts 33 in series connection with the positive line side 24 and is held in latched position by a related detent plate like the detent plate 20 previously described.

Figure 7:
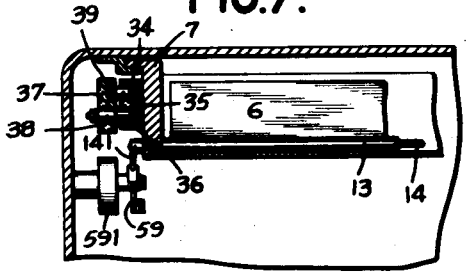
Fig. 7 is a sectional view taken on the line 7—7 of Fig. 4.

The individual selection of the account records of a particular drawer is effected by means of a contact block 34 (Fig. 7) of metal carried at the extreme left end of the drawer (Fig. 2) and which carries two spring-pressed contact plungers 35 and 36. Arranged adjacent said plungers as shown in Fig. 7 and carried by the cabinet is a longitudinal block 37 of insulating material and in which are embedded fifty contact points 38, one for each record of a drawer. For each ten contact points 38 there is embedded in the block 37 a contact plate 39, or five contact plates 39 for each drawer as shown in Fig. 11. It will be observed that when the drawer is released the plunger 35 in the movement of the drawer will successively contact the plates 39 until a selected one is reached and thereafter continued movement of the drawer will cause plunger 36 to successively contact the series of contact points 38 related to the selected plate 39 until a selected point 38 is reached, at which time the record will be in position for visual inspection.

The selection of the contact plates 39 which select the records in the tens group is under control of the bank of keys 16 and such keys are held depressed similarly to the keys 17 but are adapted to close an extra set of contacts $40_0$—$40_9$ which are supplemental to the contacts 27—30 and 29—30. These extra sets of contacts, as shown in Fig. 6, are arranged below and closed in the same manner as the sets of contacts above. The bottom contact points (Fig. 11) of sets of contact points 40 are all joined together by a common terminal 54 while the other or top points making up the contacts are connected as follows. The five upper left points of contacts $40_0$—$40_4$ are individually connected by wires $50_0$—$50_4$ to the first vertical row of plates $39_0$—$39_4$, and, by suitable wire connections $42_0$—$42_4$, to the five sets of vertical plates $39_0$—$39_4$ related to the first, third, fifth, seventh and ninth drawers because the five keys at the left closing the left five contacts 40 also select the groups of records of the groups 0-49, 100-149, 200-249, 300-349, and 400-449 and which are in the 1st, 3rd, 5th, 7th and 9th drawers. The five sets of contacts 40 at the right (Fig. 11) are connected by wires $41_5$—$41_9$ to the vertical row of plates $39_5$—$39_9$ related to drawer #2 and which plates $39_5$—$39_9$ by wire connections $41_5$—$41_9$ are also connected to sets of plates $39_5$—$39_9$ of the 2nd, 4th, 6th and 8th drawers. This latter connection is also made because records 50-99, 150-199, 250-299, 350-399 are in drawers 2, 4, 6 and 8, so as to select any tens above fifty in all drawers. Obviously, all the contact plates relating to the same group of tens in all the drawers of a set are selected in view of the multiple connections, but only one plate 39 of a particular drawer will be controlling as only that drawer is released.

Referring to Fig. 11 it will be seen that from the negative side there is a wire connection 52 to one side of each of a series of nine magnets 53, one for each drawer. The other side of each of such magnets 53 are connected by a single wire 54 which is connected to one point of each pair of the ten sets of contacts 40. A circuit is thus connected through a closed set of contacts 40 and the circuit then leads to the plate 39 selected by such closed contacts 40, thence through plunger 35, metal block 34, plunger 36 to the contact points 38 of the set related to a selected plate 39 of the drawer to be released.

The individual record selected is dependent upon which unit key 17 is depressed, the group of ten having been determined by the selected plate 39. To select the required units contact point 38 of the preselected group of tens the following electrical connections are provided.

Each key 17 of a group of ten is adapted to close its related contacts $19$ (Fig. 6) and while the bottom contact points are electrically connected together by virtue of the fact they are carried by a common plate $55$ (Fig. 6) the other contact points, of which there are also ten, are connected by vertical multiple wire connections $56_0$—$56_9$ (Fig. 11) to each group of contact points $38$ for a drawer. To further explain, in connection with a single drawer, there are provided five groups of ten contact points $38$ and the contact points selecting the "0" record for the first of each group of ten records such as 0, 10, 20, 30, 40, are connected together by a wire $56_0$ and the contact points of the "1" records for each group of ten are connected by a wire $56_1$ etc. Also, by horizontal wire connections $58_0$—$58_9$ the multiple groups of points $38$ of one drawer are interconnected with the multiple groups of contact points with every other drawer. Also each contact point of each group of ten is connected with the contact point of every other contact point in the other groups of tens with respect to the same drawer, as will be clear from the diagram. This is necessary since when a single key $17$ is depressed every record represented by that digit must be selected but only one of such records will be selected at a time.

Hence, in the movement of the drawer a preselected plate $39$ will be engaged by plunger $35$ and finally the preselected point $38$ by plunger $36$. As the point $38$ selected through the related closed contacts $19$ is engaged by plunger $36$, a circuit will be made by wire $58$ to the positive side of the line (when contacts $33$ are closed) to energize all the magnets $53$ at a certain time in the movement of a selected drawer. It will be clear that only the magnet $53$ of the released drawer will be effective.

Taking a particular example to illustrate the manner of operation to select record "177", the key $15$, which is the second key from the top in Fig. 1 is depressed, as it represents the records 101–200. This key causes closure of the second set of contacts $23$ at the left in Fig. 11, thus extending a circuit from the positive side to magnets $10_3$ and $10_4$ and both are selected as it is unknown yet which drawer is to be selected, since if the record desired was in the group of tens below fifty magnet $10_3$ would be selected, and if the desired record above fifty, magnet $10_4$ would be selected. As the tens group is in the seventies, key "70" which is key number 7 in group $16$ in Fig. 1 is depressed to select magnet $10_4$.

This will cause closure of contacts $29$—$30$ by the depression of the "70" or eighth key $16$ (from the left in Fig. 11) and a circuit extends from the negative line side by wire $31$ through closed contacts $29$, $30$ to magnet $10_4$.

Having thus determined that drawer #4 is the proper one the desired contact plate $39$ of that drawer is selected. When the contacts $40_7$ of the "70" key or eighth key $16$ from the left in Fig. 11 are closed, a circuit will be extended from the negative line side by wire $52$ to all magnets $53$ thence by wire $54$ through the closed contacts $40_7$ of the eighth key (from the left in Fig. 11) to the contact plate $39_7$ of the vertical row related to drawer #4.

The last key to be depressed comprises key "7" in row $17$ which selects by wire $56_7$ the contact point $38_7$ adjacent to the selected plate $39_7$ of the fourth drawer.

Now when the key $32$ is depressed, magnet $10_4$ will be energized to release the drawer. Plungers $35$ and $36$ of the fourth drawer finally reach plate $39_7$ and the seventh contact point $38_7$. Now the circuit extends from the negative line side, wire $52$, all the magnets $53$, wire $54$, to the contact $40_7$ of the "70" key $16$, through such closed contact points $40_7$, wire $41_7$ to the selected plate $39_7$, plunger $35$, plunger $36$, contact $38_7$, wire $56_7$, to the related contact $19_7$, thence by wire $58$ to the positive line side. As the circuit is now closed to all magnets $53$, the only magnet $53$ that is controlling is the one related to the fourth drawer. In this same manner a magnet $53$ and a related magnet $10$ are selected to accomplish the following operations.

Mounted upon a bar $591$ extending from the front of the cabinet and which is adjacent the side of each drawer is a bell-crank $59$ which has a pivotal connection at $60$ to a link $61$. One arm of the bell-crank has a hook portion $62$ in the plane of a series of arms $141$, each of which is connected to the related pivot stud $14$ of a clamp $13$. When the drawer is released and ejected by gravity the normal position of arm $61$ will cause the hook $62$ to successively engage the series of arms $141$ so as to successively overturn the series of records, but when the magnet $53$ of the released drawer is energized its armature which is the extreme end of link $61$ will be attracted to draw said link rearwardly thus rocking bell-crank $59$ clockwise so that the hook $62$ of crank $59$ escapes the arm $141$ related to the desired record leaving the selected record in full view as best shown in Fig. 4. As the adjacent record at the right has been over-turned the separation causes the selected record to be in full view for inspection or writing purposes. As bell-crank $59$ is rocked an arm $63$ will engage one of the pins $64a$ of the released drawer to thereby stop the movement of the drawer and hold the selected record in exposed position outside of the cabinet.

The mechanism disclosed in Fig. 4 is preferably provided at a suitable place outside of the cabinet by bracket $591$ so that the separation of records may be effected at a place in front of the cabinet which is convenient for inspection of the record selected.

In Fig. 6 there is shown a release key $64$ which, when depressed, will rock a strip $65$ (Fig. 6) and by engagement of strip $65$ with the series of detent plates $20$ will shift such detents to release the keys of the banks $15$, $16$ and $17$ which have been depressed. Key $32$ is preferably held in depressed position by a separate detent plate so that it will also be released by key $64$. Thus the circuits to magnets $10$ and $53$ will be opened permitting the manual restoration of the released drawer to normal. The records that have been over-turned can be reversely turned manually so that they will all be in the same overlying relationship prior to the return of the ejected drawer.

*Distant control*

The above described record-selecting mechanism may be distantly controlled so as to provide a credit-authorization system. In such a system the record-selecting keyboard is attached to a cash register CR (Fig. 1) and the banks of keys $15$, $16$ and $17$ may represent account numbers of the persons desiring credit. Thus the cash register operator may automatically select a record in the credit cabinet located in the bookkeeping department, the necessary electrical connections being made by a cable between the cash register in the sales department and the credit cabinet in the distantly separated bookkeeping department.

Item indicator

As the credit which may be secured depends upon whether the amount for which credit is desired is within the balance represented on a record it is preferable to provide an indicating mechanism by which the bookkeeper may know the amount to be debited from the account. Alternatively this may be performed by a telephone but the present arrangement provides an electrical indicating mechanism to give such an indication. The indicating mechanism may also be employed for other purposes, and the present use is merely illustrative.

Figure 8:
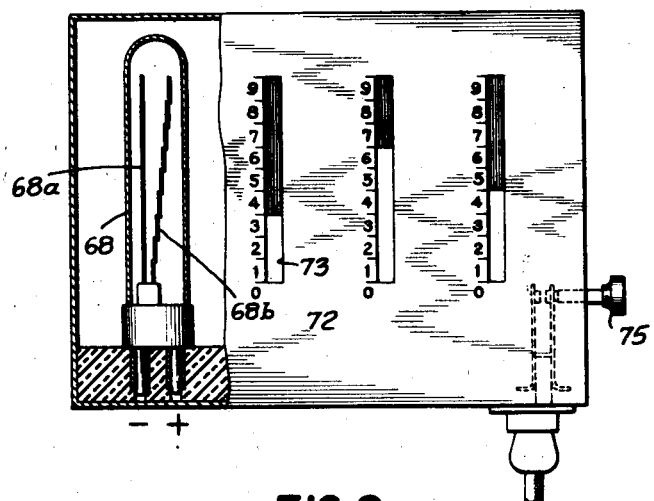
Fig. 8 is a view in front elevation of an indicating cabinet partly broken away to show a preferred construction of an indicating tube.

To illustrate one use, the amount-entering keys of banks 67 of the cash register are arranged to be locked depressed in the usual manner. The indicating mechanism consists of a series of Neon tubes 68 (Figs. 8 and 9), one for each bank of keys and each having a pair of plates, a cathode 68a and an anode 68b, the latter being bent in steps. Across such plates a potential from a source of electrical power 69 may be impressed so that the electrons which form the glow rise on the plate 68a to a desired step, depending upon the impressed voltage. Each key 67 of a bank when depressed is arranged to connect in series with the related tube 68 a predetermined portion of a resistance 70 by connecting in the circuit a certain portion thereof by connecting contacts 71 shifted by the keys to contact the resistance coil 70. By varying the voltage in the gas filled Neon tube a proportional amount of light may be secured. When such tubes are arranged in a cabinet 72 and the glow is visible through windows 73 the amount of glow or light may be determined in values by suitable scale indications. As the cabinet 72 is arranged adjacent the credit cabinet and controlled from the cash register by an interconnecting cable 74 the bookkeeper may determine the amount of credit desired.

Figure 9:
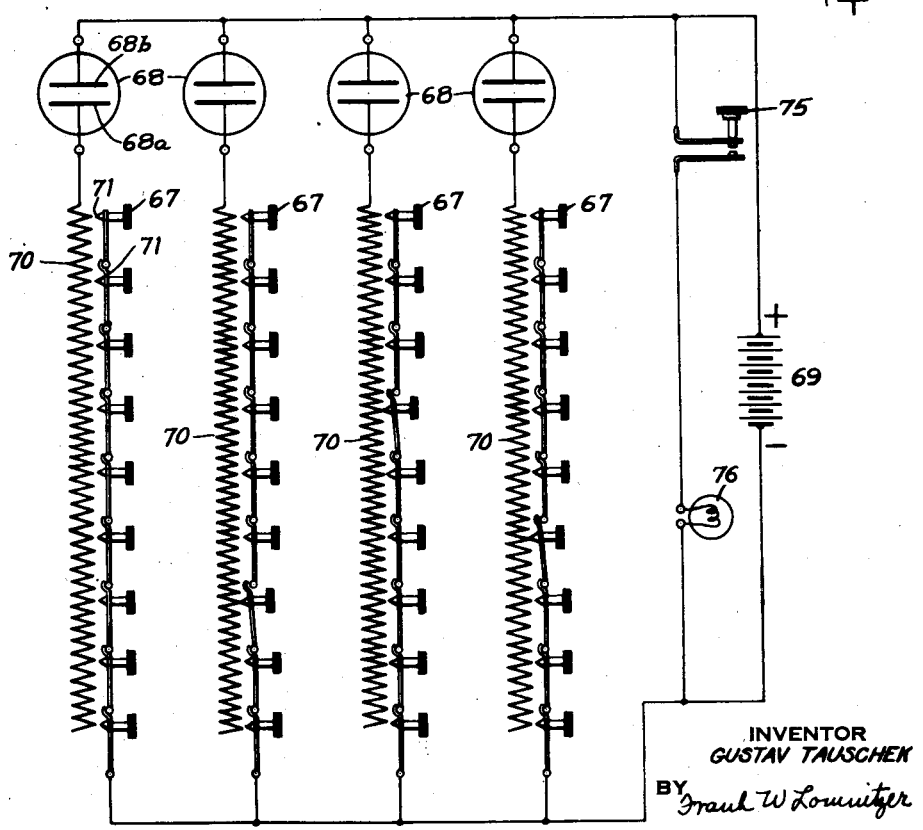
Fig. 9 is a wiring diagram of the electrical control for the indicating tubes and the signal system.

If credit is authorized the bookkeeper depresses a key 75 which, from the circuit connection in Fig. 9, will light a signal lamp 76 so that a predetermined code of signals will determine the proper procedure for the operator of the register. If unauthorized, the amount keys may be released by the usual key release lever 77 provided for a cash register so that the amount will not be registered.

Figure 10:
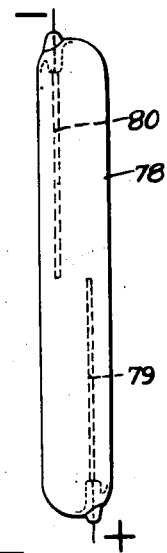
Fig. 10 is a view of a modified construction of an indicating tube.

In a modified form of indicator tube 78 shown in Fig. 10 the electrode may consist of two vertical pieces of wire, one a cathode 80 and the other an anode 79. The amount of glow in the tube is stepped in a vertical position along the cathode wire of the tube according to the impressed voltage.

When a record is selected the separation is of sufficient extent so that the bookkeeper may write upon the selected record to deduct by mental calculation the amount of the item to be debited so as to provide a continuous balance on the account record. By suitable mechanism other entries such as printing, perforating, etc. may be effected on the selected record, if desired.

The embodiment shown is adopted for purpose of illustration only and the invention is only limited by the following claims.

What I claim is as follows:—

1. In a record filing apparatus involving several groups of records, a plurality of banks of keys, means whereby one of said banks of keys selects the desired group of records, means whereby another bank of keys selects a sub-division of the selected group, means whereby the remaining bank of keys selects a desired record of the selected subdivision, and means requiring the depression of a key in the second bank recited to render the keys of the first and second banks effective to select a desired group of records.

2. In a filing apparatus, the combination of a cabinet, a filing receptacle in said cabinet and containing a group of records, means for retaining the receptacle in said cabinet, means for releasing the receptacle from said cabinet, and selective means effective after the releasing of the receptacle for selecting a particular record of said group.

3. In a filing apparatus, the combination with a cabinet, of a plurality of filing receptacles in said cabinet each containing a group of records, means for retaining said receptacles in said cabinet, means for selectively releasing said receptacles, and additional selective means effective after the releasing of one of the receptacles for locating a particular record in the selected receptacle.

4. In a filing apparatus, a plurality of filing receptacles containing a group of records, means for selecting two successive sub-divisions of the group of records, each sub-division being in one of two filing receptacles, means for selecting a particular sub-division of the two sub-divisions selected, and means for selecting a desired record in the particular sub-division selected.

5. In a filing apparatus, the combination with means for containing a series of groups of records in a filed relationship, of electrically controlled means for selecting a group of records, other electrically controlled means for selecting an individual record of a selected group, and means controlled in operation by both of said selecting means for shifting the selected record while preserving the filed relationship of the selected record with the other records.

6. In a filing apparatus, the combination with a plurality of groups of movable records in a filed relationship, of means including a plurality of record group selecting electrical circuits for selecting a group of records, selective means for selecting a particular record group electrical circuit, a plurality of electrical circuits for selecting a record of the preselected group, selective means for selecting one of the last named electrical circuits and electrically operated means automatically effective during the movement of the records and controlled by the selected group and record selecting circuits for automatically selecting the desired record while preserving the order of filing of the selected record with the other records.

7. In an electrically controlled record filing apparatus, the combination with means for containing a series of groups of records, of a series of group record-selecting circuits, a series of circuits for selecting subdivisions of a selected group, a series of circuits for selecting individual records of the selected subdivision of the selected group, and means under control of said circuits to select a record.

8. In an electrically controlled filing apparatus, the combination with means for contaning a series of groups of records, of a series of group record-selecting circuits, a series of circuits for selecting subdivisions of a selected group, a keyboard, and means including contacts controlled by the keys of the keyboard for selecting by the aforesaid different circuits a particular record, the last named means causing the shifting of the selected record for access thereto.

9. In a record filing apparatus, a movable receptacle containing a series of records, and automatic means effective during a movement of said receptacle for bringing a pre-selected record to accessible position while retaining the pre-selected record in said receptacle and preserving its order of filing.

10. In a record filing apparatus the combination with a plurality of movable record containing receptacle, of means for selecting a desired receptacle for movement, record selecting keys, and automatically operated means under control of said keys and effective during the movement of the selected receptacle for selecting a desired record for access thereto.

11. In a record filing apparatus, a movable receptacle containing a series of records, and means effective during a movement of said receptacle for bringing any pre-selected record to a common accessible position while retaining the pre-selected record in said receptacle and preserving its order of filing.

12. In a record filing machine, the combination of a cabinet, a record filing receptacle therein, a series of records each pivotally mounted in said receptacle, and means for turning each of the records in the receptacle as each record is positioned externally of the cabinet and during the ejection of the receptacle out of said cabinet.

13. In a record filing apparatus, the combination of a cabinet, a record filing receptacle normally locked in said cabinet, a series of records, each pivotally mounted in said receptacle, means for unlocking said receptacle to permit it to be withdrawn from the cabinet, and means effective during the movement of the receptacle for turning each of the records in the receptacle as each record is positioned externally of the cabinet.

14. In a record filing apparatus, a movable receptacle containing a series of records, and means effective during the movement of the receptacle for bringing a pre-selected record to an accessible position, while retaining the preselected record in said receptacle and preserving its order of filing.

15. In a record filing apparatus, the combination with a cabinet, of a record filing receptacle therein, a series of records each pivotaly mounted in said receptacle and means comprising a single member for successively shifting the records from normal position as the receptacle is withdrawn from the cabinet.

16. The invention according to claim 15 and including in combination, selective means for determining the extent of movement of the receptacle.

17. A receptacle carrying a plurality of pivoted records, a member adapted to successively shift said records about their pivotal points, and key controlled electro-magnetic means for controlling the operation of said member to select a desired record.

18. The combination with a compartment containing a plurality of overlapping pivoted records, of means for successively shifting the records about their pivots, and means for stopping the operation of the last said means when a desired record is in position for an operation thereon.

19. In an apparatus of the class described, means for successively shifting records of a group to accessible position, an electric circuit and an electro-magnet in the circuit for controlling said means, a series of contacts, and a movable contact operable upon engagement with a selected contact of the series to change the energization status of the electro-magnet by said circuit to effect the stoppage of said means.

20. In a record filing machine, a pair of receptacles each containing a group of records, selective means for selecting a sub-division of said groups of records, means for selecting a desired receptacle, and means whereby the receptacle selected by said selecting means is dependent upon the sub-division selected by said selective means.

21. In a record filing apparatus, a series of receptacles containing records, a series of keys, an electric circuit for each key, each for selecting a pair of receptacles, a second series of keys sub-divisible by electric circuit connections for selecting one or the other of a selected pair of receptacles, other electric circuits controlled by the second series of keys for selecting a subdivision of the groups of records in the selected receptacle, a third series of keys, and electric circuits therefor for selecting the desired record of the selected sub-division.

22. The invention defined in the preceding claim 21 in which a supplemental manually controlled means causes the selected circuits to control the selection of the desired record.

23. In a machine for selecting a desired record of a group contained in a receptacle, a plurality of electrical contact bars each coordinated with a sub-division of the group of records, a plurality of electrical contact points each representing a record of the group, electrical contact devices for successicely contacting with said bars and said contact points, and means whereby a selected electrical contact bar and a selected one of said contact points under control of the contact devices cause a positioning of the desired record in the receptacle for access thereto.

24. In a record filing apparatus, a series of record carrying receptacles, a fewer number of keys, means whereby each of said keys selects a pair of receptacles, a second series of keys, means whereby each of said keys of the second series selects one receptacle of the selected pair, a third series of keys, and means whereby one key of said third series selects the desired record in the desired receptacle.

25. In a filing apparatus, the combination of means for containing a series of groups of records, electrically controlled means for selecting a group of records, other electrically controlled means for selecting individual records, a single electro-magnetic means for causing the shifting of any individual record of a group, and means controlled in operation by both of said electrically controlled selecting means for causing the effectiveness of the single electro-magnetic means to shift a desired individual record.

26. In a filing apparatus, the combination with a receptacle, of a plurality of records therein arranged in groups, electrically controlled means for selecting a desired group of records, a single electro-magnetic means for causing the selection of any record of a group, and electrically controlled means for causing the single electro-magnetic means to be effective to select a desired record.

27. In a record filing machine, the combination of a cabinet, a filing receptacle movable therein, a series of records carried by said receptacle, means for selecting an individual record of the series of records, an electric circuit for controlling the actuation of said record selecting means, and electrical switching means for controlling said circuit, the effectiveness of said switching means being dependent upon the position of said receptacle relative to said cabinet.

28. In a record filing apparatus, a series of records, a receptacle containing said records, means for supporting said receptacle and for permitting its movement, an electric controlling means the effectiveness of which is dependent upon the movement of the receptacle, a single record selecting means capable of selecting any record of the series, and a circuit controlled by the electric controlling means and controlling the operation of the single record selecting means.

29. In a record filing apparatus, a receptacle, a series of records carried thereby, means for supporting said receptacle and for permitting its movement, controlling means controlled by the movement of said receptacle, record selecting means for selecting a record while retaining it in the receptacle, and operating means for the selecting means, said operating means being controlled by the controlling means.

30. In a record filing apparatus, a cabinet, a series of receptacles arranged in a vertical row in said cabinet and each independently movable in and out of said cabinet, groups of records carried by said receptacles, means adapted to cause the receptacles to be selectively moved out of said cabinet, and means for causing the selection of a record in the selected receptacle.

31. In a record filing apparatus, a cabinet, a receptacle mounted in said cabinet for movement in an inclined direction downwardly out of said cabinet and carrying records, means adapted to cause said receptacle to be moved by gravitational forces in the inclined direction downwardly out of said cabinet, and means effective during the outward movement of said receptacle for selecting a desired record therein.

32. In a record filing apparatus, a cabinet, a movable receptacle in said cabinet and carrying a series of pivoted overlapping records, means adapted to cause said receptacle to be moved out of said cabinet, means for causing records positioned out of the cabinet to be shifted about their pivots to expose one face of a desired record, said means comprising a single operating member, and means for preventing further movement of said receptacle when the desired record has been selected.

33. In a filing apparatus, the combination with a filing receptacle containing a group of records in overlapping relationship thereby preventing an operation on said records, of means operable for changing the overlapping relationship between adjacent records, and means for controlling the operation of said means to cause the overlapping relationship between predetermined adjacent records to be changed for an operation on one of the adjacent records.

34. In a filing apparatus, the combination with a cabinet, of a receptacle containing a group of pivoted records arranged in overlapping relationship and movable relatively to said cabinet, and means effective during the movement of the receptacle out of said cabinet for successively shifting a number of said records about their pivotal points whereby a predetermined record is selected for an operation thereon.

35. In a filing apparatus, the combination of a support, a plurality of receptacles containing records and each movable relatively to said support and independently of each other, means for selecting a group of records in one of said receptacles, and means adapted to cause a certain receptacle to be moved independently of the other receptacles and in accordance with the group of records selected.

36. In a filing apparatus, the combination of a support, a plurality of receptacles containing records and each movable relatively to said support, means for selecting a group of individual records in one of said receptacles, means adapted to cause a certain receptacle to be moved in accordance with the group of records selected, means for selecting an individual record of the selected group, and means for stopping the moving receptacle in accordance with the individual record selected.

37. The combination with a series of groups of records, of means for selecting only two groups of said records at a time, means for selecting either one of the selected groups of records dependent upon another selection of said records, and means for making the other selection of said records.

38. In a record filing apparatus, a cabinet, a plurality of record carrying receptacles in said cabinet, said receptacles being normally restrained from movement out of said cabinet, electro-magnetically operated means one for each receptacle for selectively releasing the receptacles for movement out of said cabinet for a record selecting operation, means for selecting a pair of electro-magnetically operated means for selection of two groups of records, means dependent upon another selection of said records to select one of the electro-magnetically operated means of the selected pair, and means for making the other selection of said records.

39. In a record filing apparatus, the combination of a cabinet, a series of receptacles each containing a series of records, means whereby each receptacle is movable independently and relatively to said cabinet, and means for selecting a series of records and adapted to select for independent movement the receptacle containing the series of records selected.

40. In a record filing apparatus, the combination of a cabinet, a series of receptacles each containing a series of records and each receptacle movable relatively to said cabinet, means for selecting a series of records and adapted to select for movement the receptacle containing the series of records selected, and means for selecting a desired record of the pre-selected series, the last named means adapted to control the extent of movement of the moving receptacle.

41. In a record filing apparatus a cabinet, a receptacle containing a series of individual records and movable relatively to and outwardly from the inside of said cabinet, and individual record selecting means for predetermining the extent of outward movement of said receptacle.

42. In a record filing apparatus, a receptacle containing a series of records and all having the same normal position but each shiftable to an off-normal position, means automatically operated for successively shifting a predetermined number of records to their off-normal positions, and means for stopping the operation of said means when a desired record has been selected.

GUSTAV TAUSCHEK.